United States Patent [19]

Leigh-Monstevens

[11] Patent Number: 4,488,701
[45] Date of Patent: Dec. 18, 1984

[54] QUICK CONNECT CYLINDER MOUNT STRUCTURE

[75] Inventor: Keith V. Leigh-Monstevens, Troy, Mich.

[73] Assignee: Automotive Products Plc., United Kingdom

[21] Appl. No.: 387,019

[22] Filed: Jun. 10, 1982

[51] Int. Cl.$^3$ ............................................. F16M 7/00
[52] U.S. Cl. .................................... 248/637; 92/169; 285/196
[58] Field of Search ................. 248/27.1, 637, 73, 56; 24/221 K, 221 A; 403/197, 194, 230; 285/196, 209, 215, 359; 60/553, 533; 92/169, 165 PR

[56] References Cited

U.S. PATENT DOCUMENTS

| | | | |
|---|---|---|---|
| 850,410 | 4/1907 | Weatherhead | 285/196 |
| 2,409,505 | 10/1946 | Magrum | 92/169 X |
| 2,890,917 | 6/1959 | Prince | 92/169 X |
| 3,203,714 | 8/1965 | Cronk Jr. | 285/359 X |
| 3,345,817 | 10/1967 | Randol | 60/553 X |
| 3,468,565 | 9/1969 | Roder | 285/194 |
| 3,650,551 | 3/1972 | Akers | 285/209 X |
| 3,967,536 | 7/1976 | Bach | 60/553 X |
| 4,080,121 | 3/1978 | Goloff et al. | 92/169 X |
| 4,286,139 | 8/1981 | Taylor | 285/196 X |

FOREIGN PATENT DOCUMENTS

| | | | |
|---|---|---|---|
| 63059 | 5/1975 | Australia | 248/56 |
| 2628324 | 1/1977 | Fed. Rep. of Germany | 411/401 |

Primary Examiner—Ramon S. Britts
Assistant Examiner—Sarah A. Lechok
Attorney, Agent, or Firm—Hauke and Patalidis

[57] ABSTRACT

A structure for mounting a housing, such as the housing of a hydraulic cylinder, on a support plate or panel by a simple manual push and twist motion exerted on the housing. The support plate or panel, such as the floorboard or bulkhead of a motor vehicle, is provided for example with a generally square opening, and the housing has a generally cylindrical mounting portion provided on one side with a circular flange of an outer diameter larger than the largest dimension of the square opening, and on its other side provided, for example, with a substantially square flange dimensioned such as to pass freely through the square opening. A resilient gasket is installed between the two flanges and is compressed such as to permit rotation of the housing for disposing the corners of the square flange in a locked position in engagement with rear surface areas of the plate or panel adjacent each straight side of the square opening. The cylindrical peripheral surface of the housing engaged in the mounting opening has tangential flat portions forming abutments engaging the edge of the square aperture, allowing rotation of the housing in one direction only and limiting rotation of the housing in that direction during installation. Abutment projections on the cylindrical peripheral surface oppose reverse rotation of the housing after installation. During installation, the elastomeric gasket is compressed, and the surface of the ears or lugs defined by each apex of the square flange in engagement with the rear surface areas of the mounting plate or panel are in the form of a ramp causing longitudinal motion of the housing during rotation to the locked position for further compressing the elastomeric gasket.

4 Claims, 5 Drawing Figures

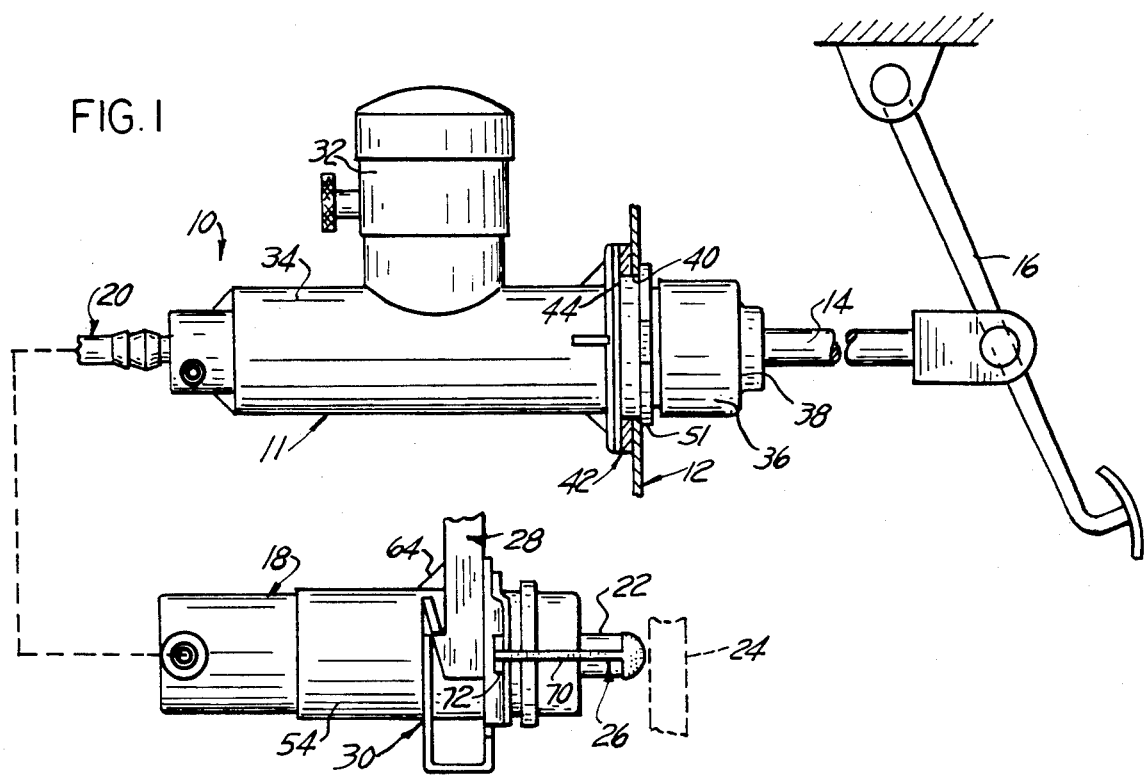
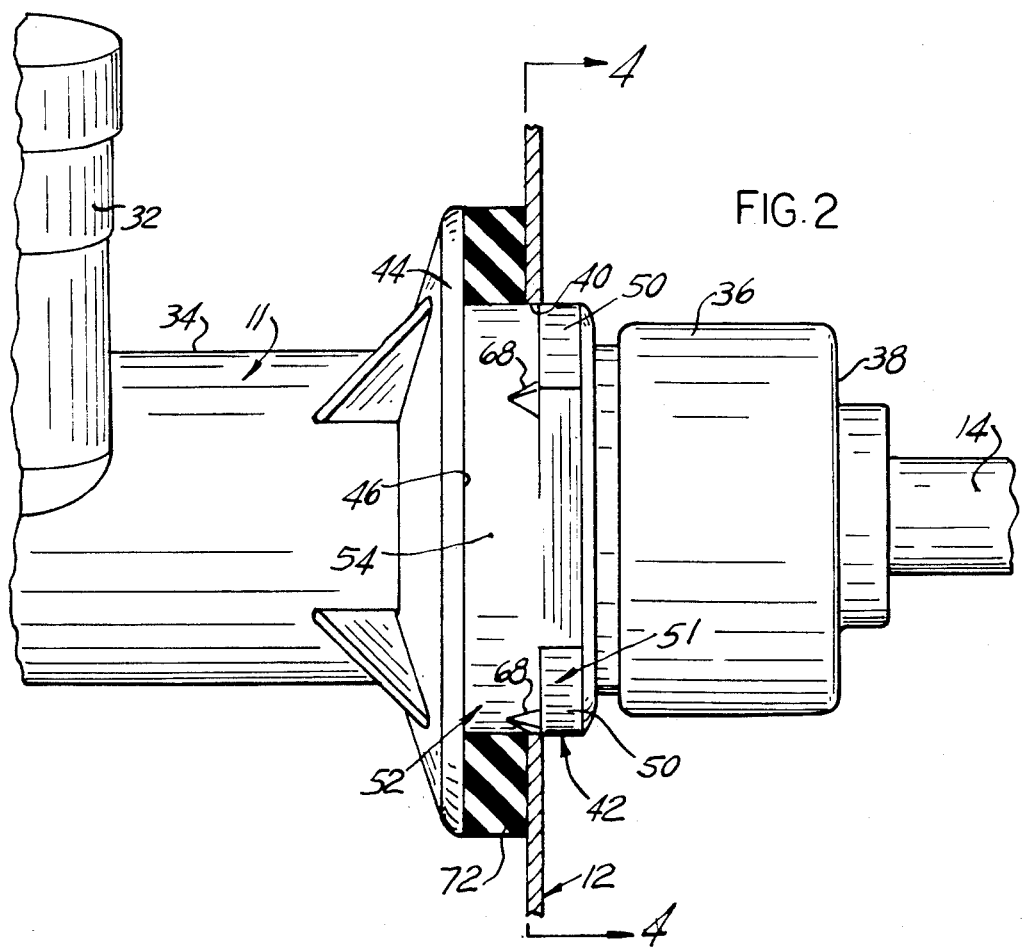

QUICK CONNECT CYLINDER MOUNT STRUCTURE

BACKGROUND OF THE INVENTION

The present invention relates to hydraulic cylinder apparatus in general and more particularly to a structure for mounting the housing of a hydraulic cylinder or other actuator on a support plate, with a portion of said cylinder projecting through the support plate.

The invention relates more specifically to apparatus such as hydraulic actuator apparatus capable of operating a mechanism at a remote location by way of for example, a master cylinder connected to a slave cylinder installed at the remote location, a flexible conduit interconnecting the master cylinder and the slave cylinder. It is known to provide such hydraulic actuator apparatus for actuating, for example, the release mechanism of a friction clutch. In British patent specification No. 1,539,879, and in co-pending application for U.S. Patent, Ser. No. 911,477, and in co-pending application for U.S. Patent, Ser. No. 344,495, filed Feb. 1, 1982, there are disclosed preassembled friction clutch hydraulic control apparatus, which are prefilled with hydraulic fluid prior to shipment to a motor vehicle manufacturer for installation on a motor vehicle.

For the purpose of installing such apparatus on the motor vehicle both the master cylinder and the slave cylinder are provided with a mounting flange integrally cast or molded with the cylinder housing and disposed peripherally to the cylinder housing at some intermediary location between the ends of the housing. The mounting flange has mounting apertures, or is provided with ears or lugs having mounting apertures for installation of the cylinder on a support plate or panel or on a support bracket. The master cylinder is generally installed by being mounted in an aperture in a bulkhead, such as the vehicle floorboard, with an end of the cylinder housing projecting on one side of the bulkhead and the other end of the housing projecting on the other side of the bulkhead. The bulkhead is provided with an opening through which the cylinder housing is passed with a plurality of mounting holes disposed on the periphery of the opening. The mounting holes in the flange of the cylinder housing, or in the mounting lugs, must be aligned with the mounting holes in the bulkhead or floorboard, and the cylinder housing securely attached in position by means of appropriate bolts, or other fasteners, passed through the aligned mounting holes. Similarly, the slave cylinder is generally supported through an opening in the clutch housing itself, or on a lug or bracket attached to the clutch housing or integrally cast with the clutch housing. The slave cylinder housing is attached in position by way of bolts passed through aligned mounting holes in the clutch housing or bracket and in the cylinder housing mounting flange or lugs.

Other mounting arrangements for master and slave cylinders have been developed in the past for simplifying the installation of such hydraulic apparatus on the assembly line of a motor vehicle manufacturer, as disclosed for example in the aforesaid British patent specification, in the form of a snap ring retainer for the slave cylinder and of a push-and-rotate fastening arrangement for the master cylinder. The master cylinder is mounted through a square opening in the bulkhead. The housing of the master cylinder is provided with a substantially square flange spaced apart from a circular flange. The square flange is of a size permitting passage thereof through the square opening in the bulkhead. A resilient gasket is installed between the two flanges and is compressed when the square flange is pushed through the square opening in the bulkhead and the housing rotated approximately 45° around its longitudinal axis, thus causing the tips of the square flange to engage the rear surface of the bulkhead proximate the square opening and hold the cylinder housing in position in view of the diagonal of the square flange having a length greater than the distance between opposite sides of the square opening. However, in such an arrangement only frictional forces resulting from the compression of the resilient gasket, and causing engagement of the square flange tip surface with the corresponding surface of the bulkhead, prevent rotation of the master cylinder housing relative to the square mounting opening, as no other positive lock is provided.

The present invention is an improvement on the master cylinder mount structure disclosed in the aforesaid British patent specification and corresponding applications for U.S. Letters Patent.

SUMMARY OF THE INVENTION

The principal object of the present invention is to provide a simple, fast and foolproof mount structure for installing a housing, such as the housing of a hydraulic cylinder, in a mounting aperture in a bulkhead or support plate, requiring no tool or conventional fasteners for mounting the housing in position, and requiring simply introduction of the housing through a mounting aperture, followed by rotation of the housing while applying light longitudinal pressure to compress a resilient gasket for irreversibly locking the housing in position.

Other objects and advantages of the present invention will become apparent to those skilled in the art when the following description of the best mode contemplated for practicing the invention is read in conjunction with the accompanying drawing wherein:

BRIEF DESCRIPTION OF THE DRAWING

FIG. 1 represents, in conjunction with hydraulic apparatus in the form of a friction clutch hydraulic release mechanism, an example of structure according to the present invention for mounting a master cylinder through the floorboard or bulkhead of a motor vehicle;

FIG. 2 is a partial and enlarged view of a portion of FIG. 1, showing the master cylinder introduced through a mounting opening in the bulkhead, prior to locking the master cylinder in the mounting opening;

DETAILED DESCRIPTION OF THE PREFERRED EMBODIMENT

Figure 3:
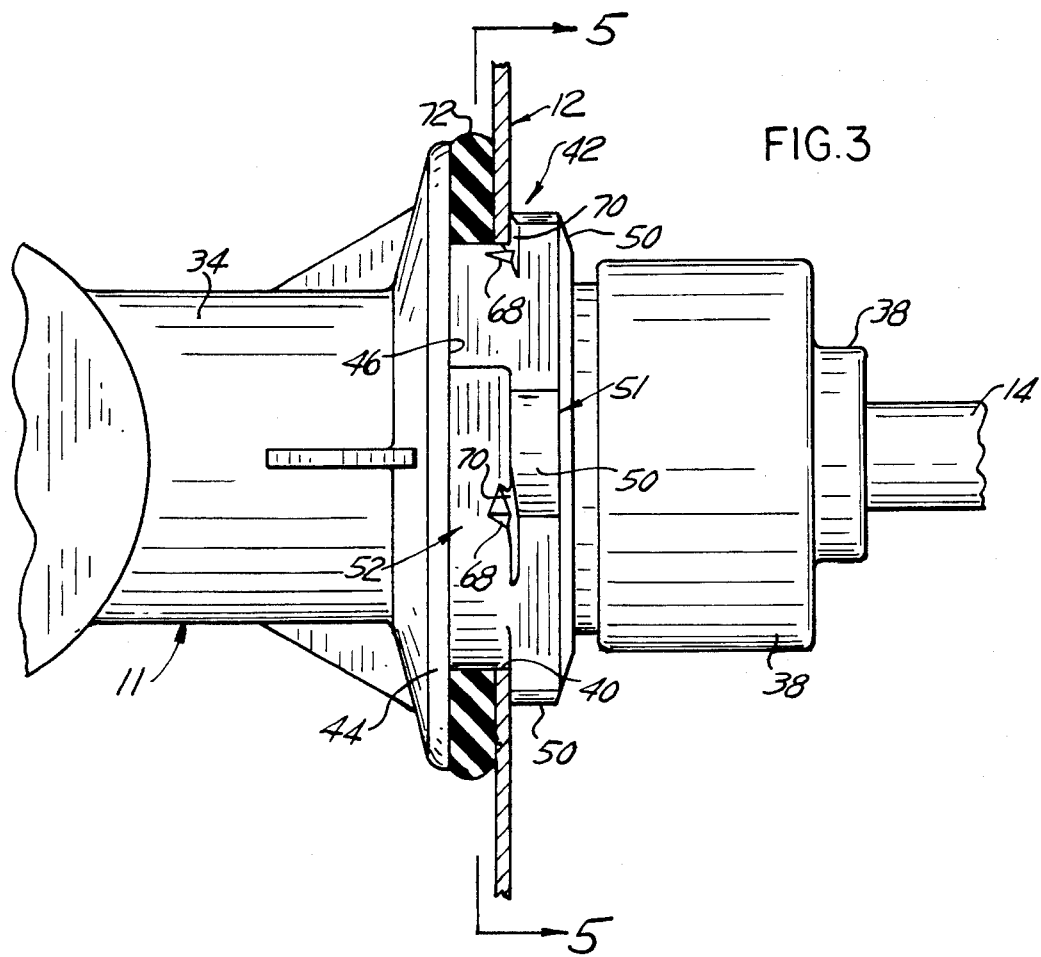
FIG. 3 is a view similar to FIG. 2 but showing the master cylinder installed in the mounting opening in the bulkhead and locked securely in position.

Referring to the drawing, and more particularly to FIG. 1, there is illustrated a hydraulic apparatus 10 in the exemplary form of a master cylinder 11 mounted in the bulkhead 12 of a motor vehicle. The master cylinder 11 has an input piston rod 14 mechanically and pivotally connected to a clutch release pedal arm 16 for actuation by the motor vehicle driver. The master cylinder 11 is connected to a slave cylinder 18 by an appropriate conduit, preferably in the form of a flexible hose 20. The slave cylinder 18 is mounted in an appropriate position on, or proximate to, the motor vehicle clutch housing in such manner that its output rod 22 operates the clutch release mechanism, such as a clutch release lever 24. In the example of structure illustrated, the output rod 22 of the slave cylinder 18 is restrained during shipment of the hydraulic apparatus 10 to the motor vehicle manufacturer, and during installation of the apparatus on the motor vehicle on the assembly line, by a break-away retaining strap 26 of the type, for example, disclosed in co-pending application Ser. No. 344,495, filed Feb. 1, 1982, and assigned to the same assignee as the present application. The slave cylinder 18 is mounted on a bracket or lug member 28 integral with the clutch or gear box housing by means of a quick-mount resilient clip 30 disclosed in detail in application Ser. No. 387,117 filed contemporaneously herewith.

Prior to shipment to the motor vehicle manufacturer, the clutch release hydraulic apparatus 10 is assembled as a complete unit, including the flexible hose 20 interconnecting the master cylinder 11 and the slave cylinder 18, and the slave cylinder output rod retaining strap 26. The apparatus 10 is installed on the motor vehicle on the assembly line as a ready-to-function unit. Prior to shipment, the hydraulic apparatus 10 is prefilled with hydraulic fluid, including filling a reservoir of hydraulic fluid which, in some structures, is a separate remotely located reservoir connected to the master cylinder 11 by a flexible hose but which, in the example of structure illustrated, is a hydraulic fluid reservoir 32 formed integrally with tne housing 34 of the master cylinder 11.

Both the housing of the slave cylinder 18 and the housing 34 of the master cylinder 11 may be cast of metal or, preferably, they are molded of plastic.

The master cylinder 11 is installed through the motor vehicle bulkhead or floorboard 12, with the end portion 36 of its housing 34 from which projects the input rod 14 disposed within the driver's compartment. The end portion 36 of the housing 34 is protected by a resilient boot 38, made of rubber or other elastomeric material, and forming a seal surrounding the input rod 14. The bulkhead 12 is provided with a generally square opening 40, best shown at FIGS. 4 and 5, and the housing 34 of the master cylinder 11 is provided with a "twist and lock" mount, generally designated at 42, for simple and rapid installation of the master cylinder 11 through the opening 40 in the bulkhead 12, without tool or conventional fasteners such as bolts or screws.

The "twist and lock" quick connect structure 42 comprises a circular flange 44 integrally cast or molded with the cylinder housing 34 and forming an annular surface 46 of a diameter larger than the widest dimension of the square opening 40 in the bulkhead 12, such widest dimension of the opening 40 corresponding to its diagonal dimension. Preferably, the tips, at which consecutive sides 47 of the square opening 40 intersect, are circularly rounded, as shown at 48, FIGS. 4 and 5, and four ears or lugs 50 are disposed radially projecting from the housing 34 of the master cylinder 11, substantially 90° apart from each other around the periphery of the housing, a predetermined distance away from the annular surface 46 of the circular flange 44. The lugs 50 define a square flange 51 with rounded corners, and the lugs 50 are each of such a shape and dimension as to freely fit within one of the rounded corners 48 of the square opening 40 in the bulkhead 12, FIGS. 2 and 4. The peripheral surface 52 of the housing 34 between the circular flange 44 and the square flange 51 has two circularly cylindrical surface portions 54 and 56. The circularly cylindrical surfaces 54 and 56 have a common centerline and their diameter is slightly less than the distance separating opposite sides 47 of the square opening 40 in the bulkhead 12. The two circularly cylindrical surfaces 54 and 56 are separated by two pairs of tangential planar surfaces 58 and 60, and 62 and 64, respectively with the result that an imaginary line 66 joining the intersection of the planar surfaces 58 and 60 to the intersection of the planar surfaces 62 and 64 has a length larger than the distance separating opposite sides 47 of the square opening 40 in the bulkhead 12. Four pyramidal projections 68, angularly 90° apart from each other, are provided on the peripheral surface 52 at the junction between each lug 50 and the peripheral surface 52. Each lug 50 has an inner surface 70 which is inclined relative to the annular surface 46 of the circular flange 44, as best shown at FIG. 3, such as to form a sloping ramp to facilitate fastening of the cylinder housing 34 to the bulkhead 12. An annular resilient and compressible gasket 72, FIGS. 2 and 3, is disposed around the peripheral surface 52 between the circular flange 44 and the square flange 51 defined by the ears or lugs 50.

Figure 4:
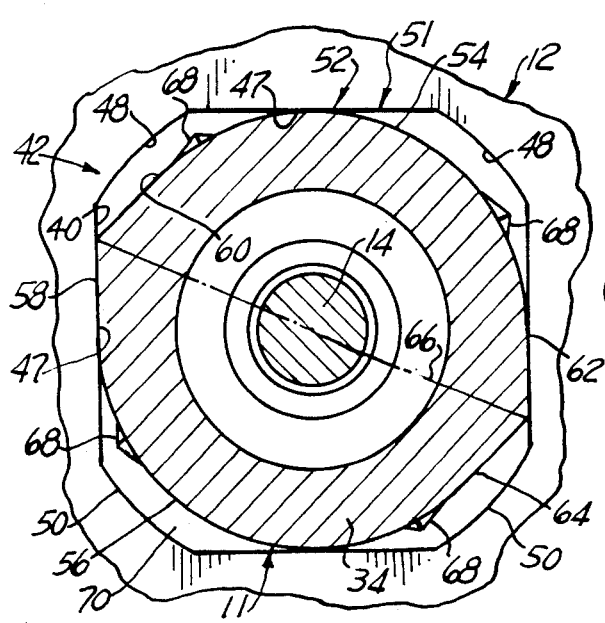
FIG. 4 is a section through line 4—4 of FIG. 2.

The master cylinder 11 is installed in the square opening 40 in the bulkhead 12 by passing the end portion 36 of the cylinder housing 34 through the square opening 40, with the housing 34 angularly positioned such that the ears or lugs 50 are aligned with the rounded corner 48 of the square opening 40, FIGS. 2 and 4. Slight pressure is manually applied upon the housing 34 toward the bulkhead 12 such as to slightly compress the elastomeric annular gasket 72. Rotation of the housing 34 in a counter-clockwise direction is prevented by the plane peripheral surface portions 58 and 62 engaging opposite sides 47 of the square aperture 40. Clockwise rotation of the housing is not prevented, however, because the diameter of the cylindrical surface portions 54 and 56 is not any larger than the distance between opposite sides 47 of the square opening 40. Clockwise rotation of the housing 34 causes further compression of the elastomeric annular gasket 72, as a result of the camming action of the inclined surfaces 70 of the ears or lugs 50 engaging the edge of the square opening 40 and clixbing upon the rear surface of the bulkhead 12 proximate the square opening 40. Rotation of the housing 34 approximately 45° around its longitudinal axis securely locks the housing in position through the square opening 40 in the bulkhead 12, the lugs 50 having rotated to the position indicated in dashed lines at FIG. 5. Further rotation of the housing 34 is prevented by the interference resulting from the flat surface portions 60 and 64 abutting opposite sides 47 of the square opening 40.

Figure 5:
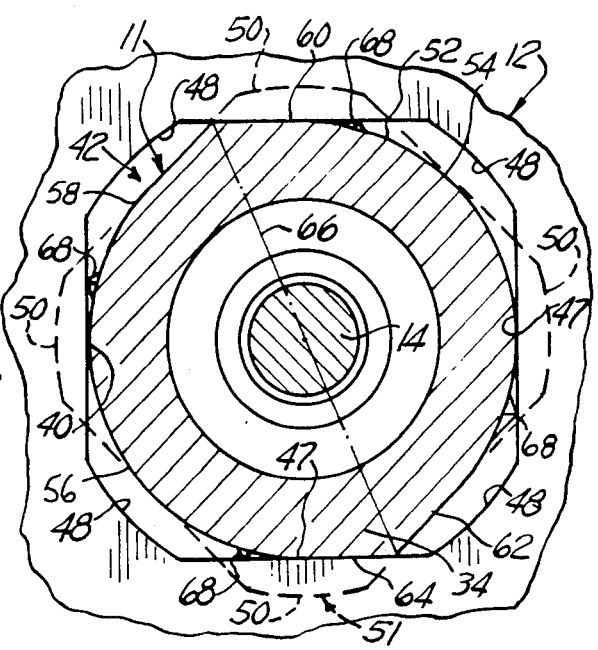
FIG. 5 is a cross-section at line 5—5 of FIG. 3.

The housing is maintained securely in its locked position as a result of each one of the pyramidal projections 68 having been rotated from the position illustrated at FIG. 4 to the position illustrated at FIG. 5, wherein each pyramidal projection 68 interferes against counter-clockwise rotation of the housing 34 by abutting against one of the edges of one of the sides 47 of the square opening 40 in the bulkhead 12. Because the housing 34 is preferably molded of plastic, and even if molded of metal, a certain amount of diametral resiliency of the housing 34 permits the pyramidal projections or protrusions 68 to pass from the position illustrated at FIG. 4 to that illustrated at FIG. 5, with a certain amount of resistance to rotation when passing over center. The resistance to rotation of the housing 34 caused by the pyramidal protrusions 68 passing over center is easily overcome manually by applying added torque when required, and by manually applying additional longitudinal pressure on the housing 34 for momentarily further compressing the elastomeric gasket 72. In addition, because the apex of each pyramidal protrusion 68 slants toward the housing peripheral surface 52 between the circular flange 48 and the square flange 51, during rotation of the housing 34 with enough torque applied thereto to overcome the momentarily resistance due to the pyramidal projections or protrusions 68 engaging the edge of the sides 47 of the square opening 40 the resultant of the torque force and of the interference of the vortex of each pyramidal protuberance 68 with the edge of a straight side 47 of the square opening 40 momentarily imparts a slight longitudinal motion to the housing 34 resulting in a momentarily slight further compression of the elastomeric annular ring 72.

After installation of the cylinder housing 34 in the mounting square opening 40 in the bulkhead 12, due to the double interferences caused by the pyramidal protrusions or protuberances 68 on one hand, and, respectively the apex of intersection of the tangential plane surfaces 58 and 60 and the apex of the tangential plane surfaces 62 and 64, rotation of the housing 34 in either direction is prevented by reason of the relatively high compression rate to which the annular elastomeric gasket 72 is subjected. The cylinder housing 34 thus is sturdily held mounted in the square opening 40 of the bulkhead 12, without risk of becoming accidentally dislodged through shock and vibration. In heavy duty applications, if more secure installation is required, at least in appearance, a single hole may be drilled through the circular flange 44 and the bulkhead 12, and a press-fit pin or self-tapping screw installed, although such further securing of the housing 34 to the bulkhead 12 has been found generally unnecessary.

Although the invention has been described and illustrated in the form of a mounting means well suited for mounting the hydraulic master cylinder of a clutch release hydraulic apparatus through a bulkhead, fire wall or floorboard of a motor vehicle, it will readily be appreciated by those skilled in the art that the same mounting xeans may be used for installing, for example, a slave cylinder for operating the release mechanism of a friction clutch. It will also be appreciated that the mounting means of the invention may be used for installing a variety of mechanical or electrical components on a support plate or panel.

It will also be further appreciated by those skilled in the art that although the example of structure described and illustrated herein takes the form of a square mounting opening in a support plate accepting a housing square flange therethrough, the same principle of quick "twist and lock" applies to structures comprising less than the four described locking lugs, for example two or three, and more than four locking lugs, for example five, six or more. The mounting aperture 40, in such configurations, has a perimeter appropriately conforming to the perimeter envelope of the lugs 50 for allowing free passage of the lugs. For example, the mounting opening 40 may be made oval for co-operating and coacting with a pair of housing mounting lugs 50 diametrally projecting from the housing 34, triangular for co-operating with three mounting lugs 50, or hexagonal for co-operating and coacting with six mounting lugs 50.

Having thus described the present invention by way of an example of structural embodiment, modifications whereof will be apparent to those skilled in the art, what is claimed as new is as follows:

1. A mounting structure for coupling a housing to a support plate comprisng a generally cylindrical peripheral surface portion on said housing, a substantially circular flange at one side of said generally cylindrical peripheral surface portion, at least a pair of symmetrically disposed radially projecting lugs at the other side of said generally cylindrical peripheral portion, a mounting opening in said plate of a perimeter generally conforming to the perimeter of said lugs and of said generally cylindrical peripheral surface portion such as to provide free passage of said lugs through said opening, a resilient gasket disposed around said generally cylindrical peripheral surface portion between said substantially circular flange and said lugs, said resilient gasket permitting passage of said lugs through said opening with resultant resilient compression of said resilient gasket, first abutment means on said generally cylindrical peripheral surface portion, said abutment means allowing rotation of said housing in a single direction after passage of said lugs through said opening for disposing each of said lugs in engagement with a rear surface area of said plate at an edge of said opening, second abutment means interfering with rotation of said housing in an opposite direction, and third abutment means limiting rotation of said housing in said single direction, wherein said first abutment means is a first tangential plane surface on said generally cylindrical peripheral surface portion, said second abutment means comprises a projection on said generally cylindrical peripheral surface portion at the junction between said surface portion and each of said lugs, said projection having a portion inclined away from said lug for causing further compression of said resilient gasket upon engagement with an edge of said opening during rotation of said housing and allowing relaxation of said resilient gasket after passage beyond said edge, and said third abutment means is a second tangential plane surface on said generally cylindrical peripheral surface portion, said second tangential plane surface being disposed symmetrically to said first tangential plane surface.

2. The structure of claim 1 further comprising an inclined ramp surface on each of said lugs causing further compression of said resilient gasket by climbing on an edge of said opening upon rotation of said housing.

3. The structure of claim 1 wherein said housing is the housing of a hydraulic cylinder.

4. The structure of claim 3 wherein said hydraulic cylinder is the master cylinder of a motor vehicle clutch hydraulic release apparatus.

* * * * *

UNITED STATES PATENT AND TRADEMARK OFFICE
CERTIFICATE OF CORRECTION

PATENT NO. : 4,488,701

DATED : December 18, 1984

INVENTOR(S) : Keith V. Leigh-Monstevens

It is certified that error appears in the above-identified patent and that said Letters Patent are hereby corrected as shown below:

Col. 3, line 17, change "387,117" to --387,017--.

Col. 4, line 44, correct the spelling of "climbing".

Col. 5, line 44, correct the spelling of "means".

Signed and Sealed this

Twenty-fifth Day of June 1985

[SEAL]

Attest:

DONALD J. QUIGG

Attesting Officer     Acting Commissioner of Patents and Trademarks